Sept. 8, 1931.  R. T. GRIFFITHS  1,822,212
HAND GRIP SLEEVE AND METHOD OF MAKING SAME
Filed Jan. 25, 1929
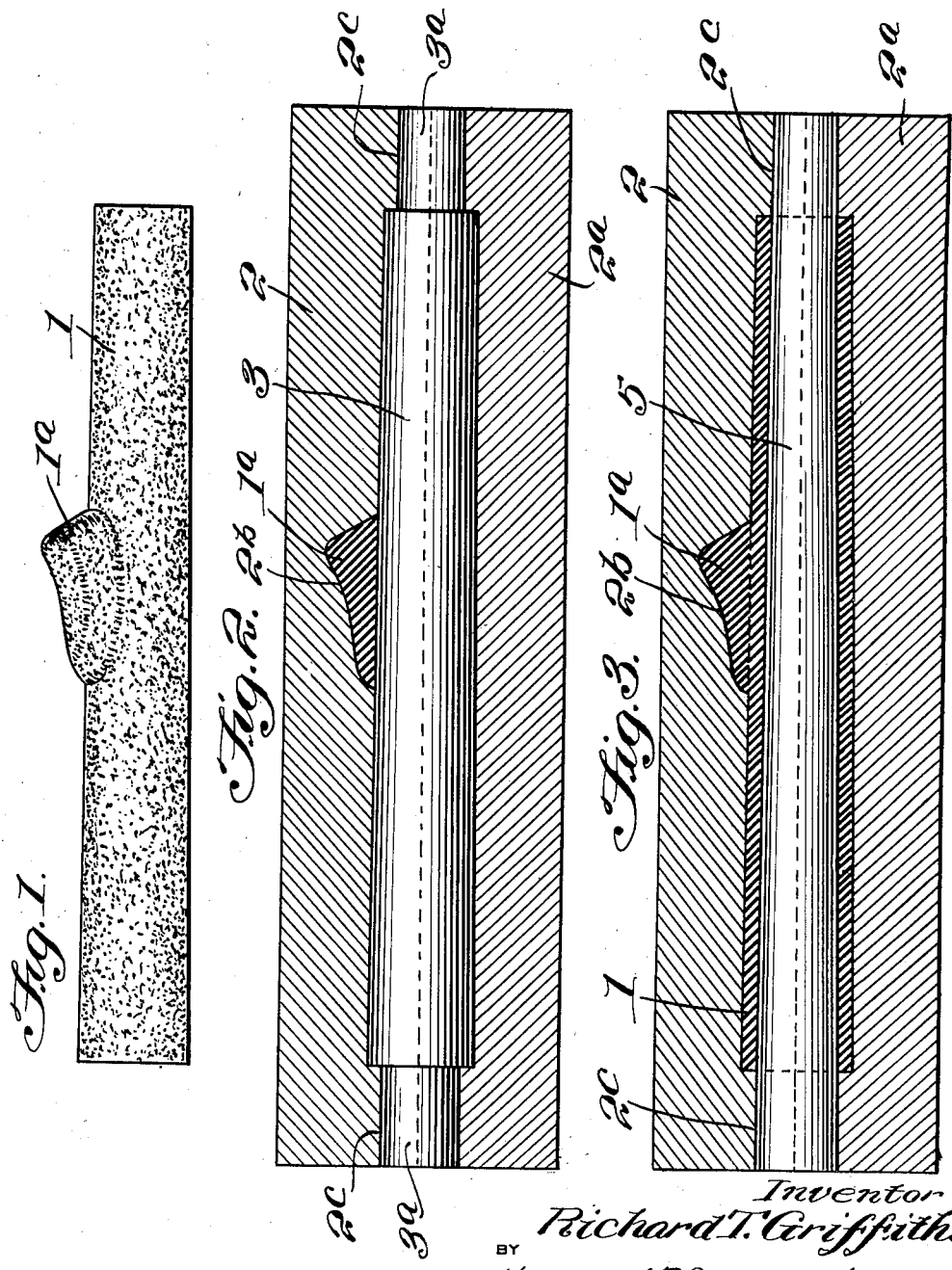
Inventor
Richard T. Griffiths Patented Sept. 8, 1931

1,822,212

UNITED STATES PATENT OFFICE

RICHARD T. GRIFFITHS, OF AKRON, OHIO, ASSIGNOR, BY MESNE ASSIGNMENTS, TO MILLER RUBBER COMPANY INC., OF WILMINGTON, DELAWARE, A CORPORATION OF DELAWARE

HAND GRIP SLEEVE AND METHOD OF MAKING SAME

Application filed January 25, 1929. Serial No. 334,993.

My said invention relates to improvements in hand grip sleeves applicable to the handles of various articles but designed more particularly for the shafts of golf clubs.

Sleeves of soft, resilient rubber have heretofore been used for hand grips for golf clubs and it has been proposed to provide these with protuberances in the shape of thumb rests for giving a better grip and ensuring proper position of the hands in grasping the club, such protuberances being formed by enlargements of the same soft rubber composition. It has been found in practice that such soft rubber protuberances do not function satisfactorily.

The present invention aims to provide a sleeve which will overcome this objection in that it will have protuberances or thumb rests which are of firmer material than the foundation sleeve resiliently supported thereby and homogeneously united thereto, whereby the thumb-rests while made of less resilient material will be supported upon a resilient cushion provided by the sleeve.

In order that the invention may be more readily understood, reference is made to the accompanying drawings, in which:

Fig. 1 is a side elevation of the improved sleeve.

Figs. 2 and 3 are sectional views of the mold as used in carrying out my improved method.

Referring by reference characters to the drawings, the numeral 1 designates the sleeve of soft, resilient, vulcanized rubber, and 1a the protuberances or thumb rests, resiliently supported thereby, which are made of harder or firmer vulcanized rubber, peferably containing fibrous material distributed therethrough. The shape and size of the sleeve would of course depend on the character of article on which it is used, and the protuberances, of course, may be shaped according to circumstances of use or manner of grip. In the drawings the sleeve is shown as adapted for application to a golf club shaft.

In the drawings, 2 and 2a designate the two halves of a mold having a main substantially cylindrical cavity conforming to the shape of the desired sleeve. It may of course be slightly tapered to conform to the tape of the customary shaft.

This mold cavity is provided with recesses 2b to receive the protuberance or thumb rest forming material.

3 designates a substantially cylindrical mandrel of a size and shape corresponding to the sleeve to which the protuberances are to be applied, this mandrel having reduced ends 3a resting in guide or supporting recesses 2c in the mold, the mandrel entirely filling the mold cavity apart from the recesses 2b.

These latter recesses are filled with a relatively hard or firm rubber composition (indicated at 1a) and the mold section and mandrel assembled as shown in Fig. 2, whereupon the mold is subjected to vulcanizing heat to partially vulcanize the portions 1a. The mold is then opened and the mandrel 3 removed (leaving the rubber parts in their recesses) and a mandrel 5 of less diameter substituted therefor (Fig. 3) carrying a sleeve 1 of soft rubber, which when in place in the mold cavity fills the same and contacts with the exposed surfaces of the portions 1a on assembly of the mold, as shown in Fig. 2. The mold is now subjected to further vulcanizing heat to partially vulcanize the tube or sleeve 1 and further but still incompletely vulcanize the parts 1a, which for this purpose may be of slower vulcanizing compound than the sleeve. This partial vulcanization unites the portions 1a homogeneously to the sleeve and enables the article to be removed as a unit on again opening the mold.

Thereafter the outer surface of the sleeve and protuberances is given a coat of rubber cement and dusted or otherwise covered with finely comminuted cork. The sleeve is again placed in the mold and subjected to further heat to complete the vulcanization of the sleeve and protuberances and vulcanize the cork particles in place, the presence of the mold causing the particles to be embedded in the surface of the sleeve.

I claim:

1. As an article of manufacture, a hand grip sleeve of relatively soft resilient material having protuberances of less resilient material resiliently supported thereby and homogeneously united thereto.

2. As an article of manufacture, a hand grip sleeve of relatively soft resilient rubber having protuberances of less resilient rubber resiliently supported thereby and homogeneously united thereto.

3. As an article of manufacture, a substantially cylindrical hand grip sleeve for golf clubs of relatively soft resilient rubber having protuberances of less resilient rubber resiliently supported thereby and homogeneously united thereto.

4. The article of claim 1, having comminuted cork embedded in the surface of the sleeve and protuberances and vulcanized thereto.

In testimony whereof, I affix my signature.

RICHARD T. GRIFFITHS.